United States Patent
Madhavarao et al.

(10) Patent No.: US 7,552,306 B2
(45) Date of Patent: Jun. 23, 2009

(54) SYSTEM AND METHOD FOR THE SUB-ALLOCATION OF SHARED MEMORY

(75) Inventors: Sankarshana Madhavarao, Lake Forest, CA (US); Andrey Savov, Fullerton, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 270 days.

(21) Appl. No.: 11/273,048

(22) Filed: Nov. 14, 2005

(65) Prior Publication Data

US 2007/0113039 A1 May 17, 2007

(51) Int. Cl.
*G06F 12/02* (2006.01)

(52) U.S. Cl. ...................................... 711/170
(58) Field of Classification Search .................. 711/170
See application file for complete search history.

(56) References Cited

U.S. PATENT DOCUMENTS

| | | |
|---|---|---|
| 5,197,148 A | 3/1993 | Blount et al. |
| 5,539,899 A | 7/1996 | Huynh et al. |
| 5,802,341 A | 9/1998 | Kline et al. |
| 5,877,081 A | 3/1999 | Matsumoto et al. |
| 5,923,833 A | 7/1999 | Freund et al. |
| 5,930,830 A | 7/1999 | Mendelson et al. |
| 6,114,970 A | 9/2000 | Kirson et al. |
| 6,141,722 A | 10/2000 | Parsons |
| 6,282,621 B1 | 8/2001 | Parsons |
| 6,289,424 B1 | 9/2001 | Stevens |
| 6,401,181 B1 * | 6/2002 | Franaszek et al. ........... 711/170 |
| 6,453,430 B1 | 9/2002 | Singh et al. |
| 6,480,845 B1 | 11/2002 | Egolf et al. |
| 6,496,916 B1 | 12/2002 | Fadavi-Ardekani et al. |
| 6,504,619 B1 | 1/2003 | Kageyama et al. |
| 6,523,104 B2 | 2/2003 | Kissell |
| 6,594,779 B1 | 7/2003 | Chandra et al. |
| 6,665,785 B1 | 12/2003 | Hamilton, II et al. |
| 6,857,058 B1 | 2/2005 | Gurumoorthy et al. |
| 6,880,022 B1 | 4/2005 | Waldspurger et al. |
| 6,912,641 B2 | 6/2005 | Chen et al. |
| 2002/0062366 A1 * | 5/2002 | Roy et al. ................ 709/224 |
| 2003/0014685 A1 | 1/2003 | Chong, Jr. |
| 2004/0098739 A1 * | 5/2004 | Rakib ..................... 725/15 |
| 2004/0236924 A1 | 11/2004 | Johnson et al. |

* cited by examiner

*Primary Examiner*—Hyung S Sough
*Assistant Examiner*—Hamdy S Ahmed
(74) *Attorney, Agent, or Firm*—Tucker Ellis & West LLP

(57) ABSTRACT

This invention is directed to a system and method for allocation of random access memory. A memory area is first acquired from a primary memory allocation system of an associated data processing system. The memory area includes a plurality of uniformly fixed size memory blocks. Next an application program interface is interfaced with a plurality of processes in connection with memory needed for each process. A memory request is then received from each of the processes via the application program interface with each memory request including data representing a requested memory allocation size associated therewith. Memory from the acquired memory blocks is then allocated to each of the processes corresponding to each received memory request. Each allocation is defined by a base memory address disposed within the memory area, an offset value corresponding to the base memory address, and a corresponding memory allocation size.

6 Claims, 4 Drawing Sheets

SYSTEM AND METHOD FOR THE SUB-ALLOCATION OF SHARED MEMORY

BACKGROUND OF THE INVENTION

This invention is directed to a system and method for allocating random access memory. In particular, this invention is directed to a system and method for the sub-allocation of blocks of shared system random access memory. More particularly, the present invention is directed to a system and method for acquiring segments of shared memory from a system and then allocating blocks of shared memory from the acquired segments.

The use of shared memory for inter-process communications is commonly used in many data processing environments. Shared memory enables one or more processes to communicate via a memory that appears in all of their virtual address spaces. In certain operating systems, such as Linux, processes requesting the use of shared memory do not always get the exact size requested via the system calls. The allocated amount of shared memory is typically the requested amount rounded up to a multiple of PAGE_SIZE, thus when 100 bytes of shared memory is requested, 4096 bytes of shared memory is allocated by the system. When 5000 bytes of shared memory is requested, the system returns a multiple of PAGE_SIZE, thus since the requested amount is greater than the amount of a single PAGE_SIZE, the system rounds up and 8192 bytes of shared memory are allocated. The foregoing typical allocation of shared memory results in large, wasted portions of the system memory.

Thus there is a need for a system and method for sub-allocating shared system random access memory.

SUMMARY OF THE INVENTION

In accordance with the present invention, there is provided a system and method for allocating random access memory.

Further in accordance with the present invention, there is provided a system and method for the sub-allocation of blocks of shared system random access memory.

Still further, in accordance with the present invention, there is provided a system and method for acquiring segments of shared memory from a system and then allocating blocks of shared memory from the acquired segments.

In accordance with the present invention, there is provided a system for allocation of random access memory. The system includes acquiring means adapted to acquire a memory area from a primary memory allocation system of an associated data processing system. The memory area is suitably comprised of a plurality of uniformly fixed size memory blocks. The system also includes an application program interface adapted to interface with multiple processes in connection with the memory needed for each process. The system further includes receiving means adapted to receive a memory request from each of the processes via the application program interface. Each memory request includes data representing an associated requested memory allocation size. In addition, the system includes memory allocation means adapted to allocate each of the processes and corresponding to each received memory request, memory from the acquired memory blocks. Each allocation is defined by a base memory address disposed within the memory area, and an offset value corresponding to the base memory address and a corresponding memory allocation size.

Further in accordance with the present invention, there is provided a system for allocation of random access memory. The system includes loading means adapted to load a memory management system for each of a plurality of processes. The memory management system includes acquisition means adapted to acquire a memory area from a primary memory allocation system of an associated data processing system. The memory area is suitably comprised of a plurality of uniformly fixed size memory blocks. The memory management system also includes an application program interface adapted to interface with an associated process in connection with the memory needs associated with the process. The memory management system further includes receiving means adapted to receive at least one memory request from the associated process via the application program interface. Each memory request includes data representing an associated requested memory allocation size. In addition, the memory management system includes memory allocation means adapted to allocate, to the associated process and corresponding to each received memory request, memory from the acquired memory blocks. Each allocation of memory is defined by a base memory address disposed within the memory area, and an offset value corresponding to the base memory address and a corresponding memory allocation size.

Still further, in accordance with the present invention, there is provided a method for allocation of random access memory. The method begins by acquiring a memory area from a primary memory allocation system of an associated data processing system. The memory area includes a plurality of uniformly fixed size memory blocks. Next an application program interface is interfaced with a plurality of processes in connection with memory needed for each process. A memory request is then received from each of the processes via the application program interface with each memory request including data representing a requested memory allocation size associated therewith. Memory from the acquired memory blocks is then allocated to each of the processes corresponding to each received memory request. Each allocation is defined by a base memory address disposed within the memory area, an offset value corresponding to the base memory address, and a corresponding memory allocation size.

Further, in accordance with the present invention, there is provided a method for allocation of random access memory. The method begins by loading, for each of a plurality of processes, a memory management system. Next, a memory area from a primary memory allocation system of an associated data processing system is acquired, with the memory area consisting of a plurality of uniformly fixed size memory blocks. The method also includes interfacing, via an application program interface, with an associated process in connection with memory needed therefore. At least one memory request is then received from the associated process via the application program interface, with each memory request containing data representing a requested memory allocation size associated therewith. Memory from the plurality of acquired memory blocks is subsequently allocated to the associated process and corresponding to each received memory request. Each allocation is defined by a base memory address disposed within the memory area, an offset value corresponding to the base memory address, and a corresponding memory allocation size.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

The present invention is directed to a system and method for allocating random access memory. In particular, this invention is directed to a system and method for the suballocation of blocks of shared system random access memory. More particularly, the present invention is directed to a system and method for acquiring segments of shared memory from a system and then allocating blocks of shared memory from the acquired segments.

Figure 1:
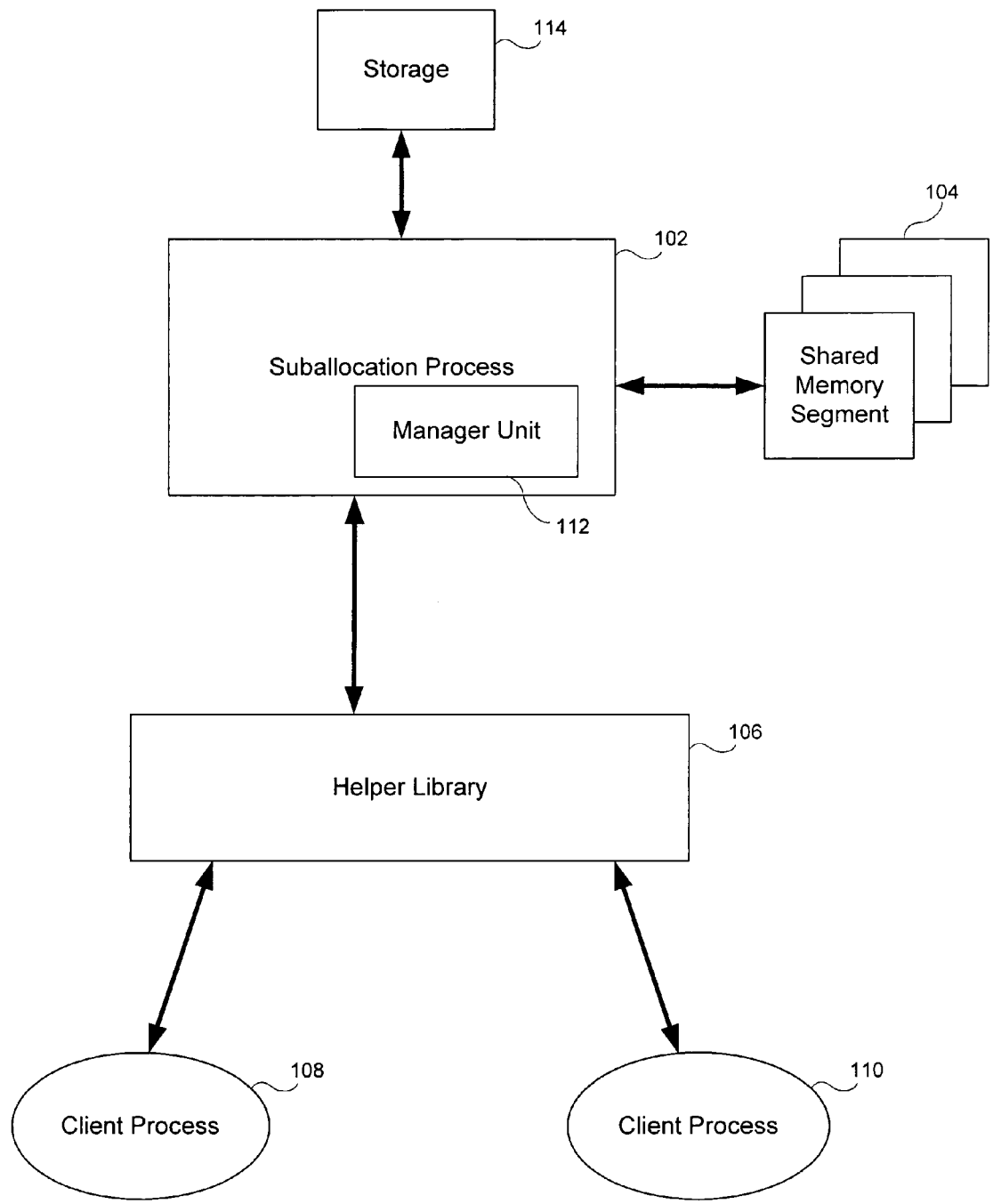
FIG. 1 is a block diagram illustrating a system for allocation of random access memory in accordance with the present invention.

Turning now to FIG. 1, there is shown a block diagram illustrative of a system 100 in accordance with the present invention. Those skilled in the art will appreciate that the diagram of FIG. 1 is for example purposes only and the present invention is not so limited. As shown in FIG. 1, the system 100 includes a shared memory suballocation server process 102, referred to hereinafter as the suballocation server 102. In the preferred embodiment, the suballocation server 102 is suitable implemented as a stand-alone process, managing shared system memory in accordance with the method of the present invention. In one embodiment, the suballocation server 102 is integrated as a component of requesting client services, which will be explained in greater detail below with respect to FIG. 4. The suballocation server 102 functions to acquire memory from shared system memory, illustrated in FIG. 1 as the shared memory segments 104. It will be understood by those skilled in the art that shared system memory is capable of being any shared memory known in the art capable of use by a plurality of client processes. In the preferred embodiment, the suballocation server 102 acquires large chunks of shared memory segments 104, which the server 102 slices, i.e., divides, into blocks of a size corresponding to the amount of memory requested by a client process. In the preferred embodiment, the shared memory is random access memory, virtual or real, suitably capable of being shared among multiple processes.

The shared memory segments 104 are advantageously mapped to the address space of the suballocation server 102. Preferably, the suballocation server 102 includes a manager unit 112, i.e., a HEAP manager, suitably adapted to manage the area of memory used for dynamic memory allocation, wherein blocks of memory are allocated and freed in an arbitrary order and the pattern of allocation and size of blocks is not known until run time. It will be appreciated by those skilled in the art the term segment is used herein to refer to portions of shared memory of a uniformly fixed size, such as for example and without limitation, 4096 bytes of memory. Blocks, as used herein, refer to portions of shared memory having a size dictated by the amount of memory requested by a client process, which are capable of being greater than a single segment or less than a single segment in size. In accordance with the present invention, the manager unit 112 locates free blocks in the shared memory segments 104 and allocates such blocks to the client processes.

To facilitate the interaction between one or more client processes, illustrated in FIG. 1 as the client process 108 and the client process 110, the system 100 employs a helper library 106. It will be appreciated by those skilled in the art that the helper library 106 is suitably adapted to provide an interface to the client processes 108, 110. In the preferred embodiment, the interface so provided to the client processes is comprised of one or more application program interfaces, as are known in the art. Preferably, the application program interfaces are adapted for the allocation and release of shared memory blocks in accordance with the methods described below In one embodiment of the present invention, communication between the suballocation server 102 and the client processes 108, 110 is advantageously accomplished via message queues, sockets, and the like.

In operation, the client processes 108, 110 load the helper library 106 and call application program interfaces to allocate and/or free shared blocks of memory. The helper library 106 in turn communicates with the suballocation server 102 to allocate/free the shared blocks of memory assigned by the suballocation server 102. It will be understood by those skilled in the art that the client processes 108, 110 are thereby kept unaware of the underlying implementation of shared memory and interact solely with the helper library 106. The client processes 108, 110 require only the starting address of the shared memory block that is allocated as a result of its request. In the embodiment wherein the suballocation server 102 is independent of the processes 108, 110, the starting address provided by the suballocation server 102 for the shared memory block is not discernable by the address space used by the client processes 108, 110. The helper library 106 is therefore used to facilitate translation from the address space of the suballocation server 102 to the address space of the requesting clients 108, 110

To enable the translation, the suballocation server 102 issues a pair, containing the shared segment identification from which the new block is allocated and the offset within this shared segment at which the new block begins. In this manner, the suballocation server 102 is able to slice the shared segments 104 into blocks so that multiple client processes are able to use the same segment of shared memory, thereby increasing overall efficient use of the shared system memory. When allocation is successful, the helper library 106 receives the pair from the suballocation server 102 and translates this pair to a memory address understandable by the requesting client device 108, 110. It will be appreciated by those skilled in the art that the helper library 106 is advantageously capable of providing an implementation independent interface to the clients, which enables such translation to become effective.

To translate the pair received from the suballocation server 102, the helper library 106 maps the shared segment 104 identified by the issued segment identification to the client process 108, 110 address space at X. The helper library 106 then computes the starting address Y of the new block by adding the offset to the address X. The skilled artisan will appreciate that he starting address Y now represents the starting address of the new block in the context of the requesting client process 108, 110. Preferably, during the allocation and freeing of memory blocks, state data representative of each allocation and/or free block is maintained in a persistent storage 114. The persistent storage 114 is preferably a nonvolatile storage device, suitably capable of retaining data should power be lost. More preferably, the persistent storage is a shared memory area, segments of a memory-mapped file, or the like. In accordance with the present invention, the persistent storage 114 is communicatively coupled to the suballocation server 102, whereupon as the server 102 allocates or frees memory blocks, data representative of the allocation or freedom is stored on the persistent storage 114. As will be understood by those skilled in the art, the suballocation server 102 allocates its dynamic data structures, i.e., state data representing the allocation or availability of memory blocks, manager unit 112 data structures, and the like, on the persistent storage 114. To enable restart of the suballocation server 102 in the event that power loss or other terminating event occurs, the suballocation server 102 controls the allocation of data structures, including state data, on the persistent storage.

In accordance with one embodiment of the present invention, the suballocation server 102 designates the allocation address for each dynamic data structure it uses, with each data structure being allocated at the designated address. When an abnormal termination of the suballocation server 102 occurs, the designated address information is used to reinstate the suballocation server 102 to its original state. Thus, upon restart, the suballocation server 102 retrieves the state data and other data structures from the persistent storage and is thereby able to continue the allocation of shared memory blocks to requesting client processes.

In an alternate embodiment, the suballocation server 102 is suitably adapted for use as an in-process component, loaded dynamically by each of the client processes 108, 110 using the shared memory 104. It will be understood by those skilled in the art the this embodiment does not require the use of the helper library 106, as each of the allocation and/or freedom operations, with respect to shared memory blocks, is performed locally, negating the need for a translation from the suballocation server 102 address space to the client process 108, 110 address space. Those skilled in the art will further appreciate that the data structures required for maintaining block information, i.e., state data, is accessible to the suballocation server 102 operating in each client process 108, 110 respective address spaces. As this requires that the information be accessible to each client process, the allocation information is stored in a shared memory area, memory mapped file, or the like, accessible in the context of each client process 108, 110, using the shared memory 104, which negates the need for a persistent storage. In accordance with this embodiment, the allocation and freedom operations are shared across client processes 108, 110. The foregoing embodiments will be better understood in conjunction with the methods described in FIGS. 2, 3, and 4, discussed hereinafter.

Figure 2:
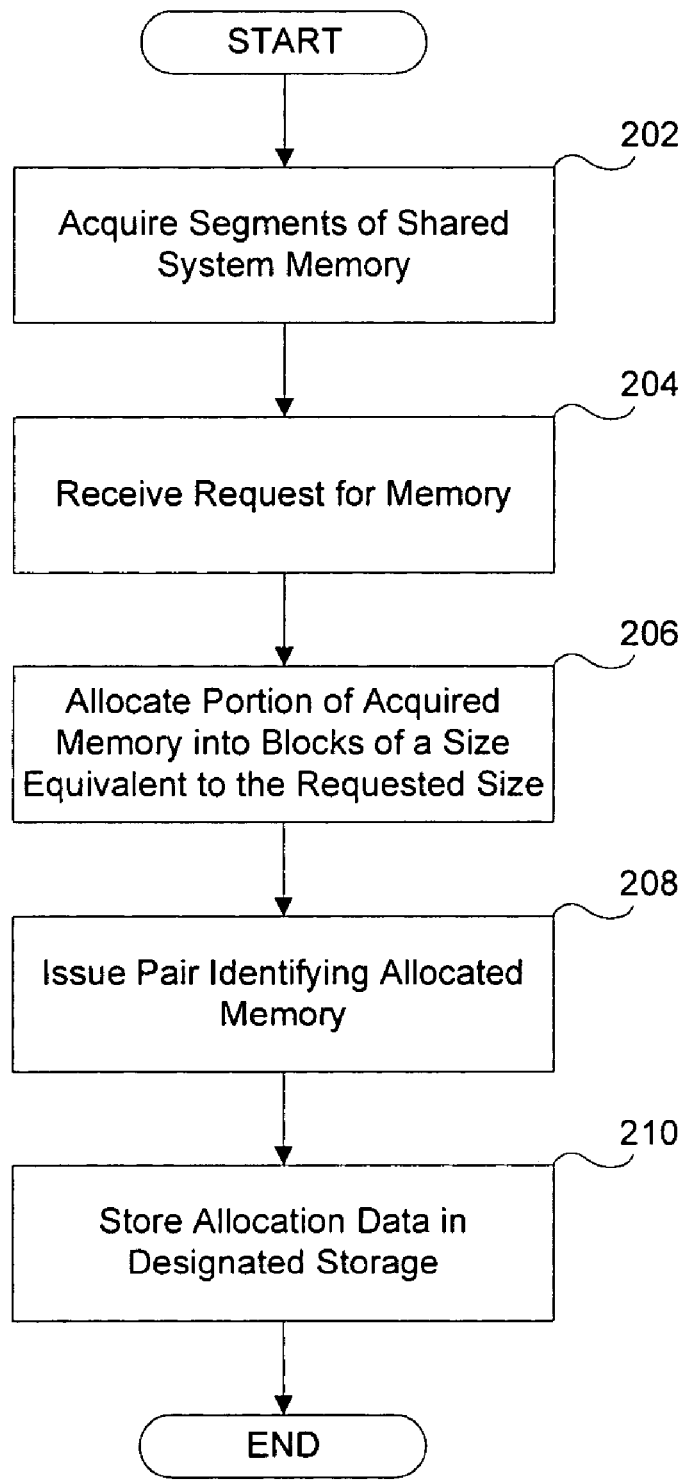
FIG. 2 is a flow chart illustrating a suballocation server method for allocation of random access memory in accordance with the present invention.

Referring now to FIG. 2, there is shown a flowchart 200 illustrating a server-side method for allocating random access memory in accordance with the present invention. The method begins at step 202, wherein the suballocation server 102 acquires segments of the shared system memory 104. It will be understood by those skilled in the art that the portion of the system memory 104 acquired by the suballocation server 102 is owned, as is known in the art, by the server 102. At step 204, the suballocation server 102 receives a request for memory from an associated client process 108. In accordance with the present invention, a request from a client process for the use of shared memory suitably includes, but is not limited to, the size of required memory, for example and without limitation, 1 byte to several million bytes. It will further be appreciated by those skilled in the art that the request received by the suballocation server 102 is received from the client process 108 via the helper library 106. In an alternate embodiment, the allocation server 102, functioning as an in-process component, receives the request directly from the client process 108.

At step 206, the suballocation server 102 allocates a portion of the acquired memory segments 104 into blocks of an amount equal to the amount requested by the client device. Thus for example, multiple blocks are capable of being sliced out of a single segment, to enable multiple processes to use the same segment of shared memory. Following allocation of a block of memory corresponding to a received request for shared system memory, flow proceeds to step 208, wherein the suballocation server 102 issues a pair identifying the allocated memory to the requesting client process. Preferably, the pair is representative of a shared segment identification from which the block is allocated and an offset within this shared segment at which the new block begins. More preferably, the pair is issued and transmitted to the helper library, explained more fully with respect to FIG. 3. Following issuance of the pair, flow proceeds to step 210, wherein the allocation state data corresponding to the allocation of the memory block is stored in persistent storage, so as to maintain the allocation records of each memory block in the event of an abnormal termination of the suballocation server 102. In an alternative embodiment, the allocation state data is advantageously stored on a portion of the shared memory, accessible by other client processes, as set forth in FIG. 4, described in greater detail below.

Figure 3:
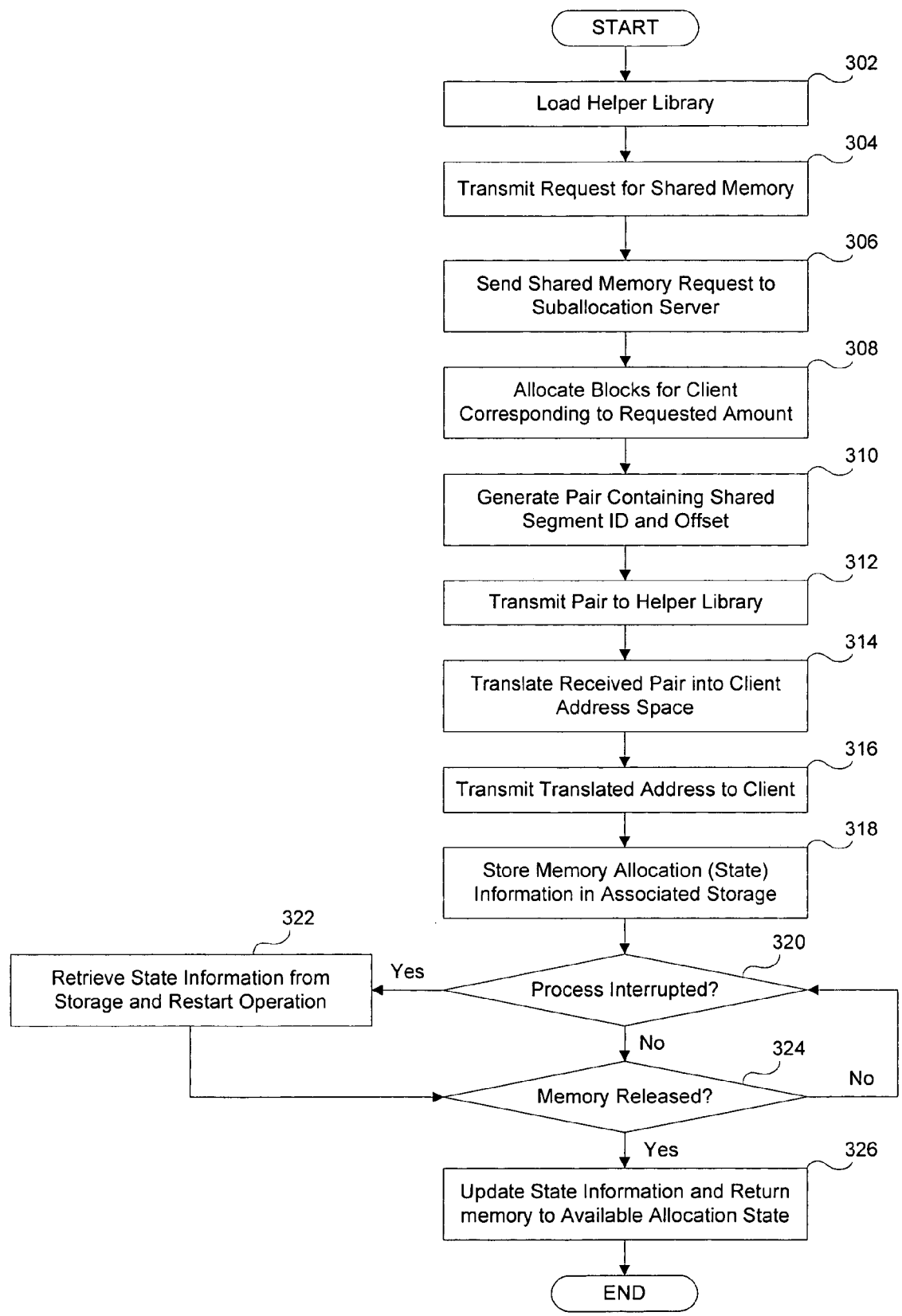
FIG. 3 is a flow chart illustrating a method for allocation of random access memory in accordance with the present invention.

Turning now to FIG. 3, there is shown a flowchart 300 illustrating the allocation of memory by the suballocation server 102, wherein the suballocation server 102 is independent of the client processes 108, 110 requesting allocation of shared memory 104. The method begins at step 302, wherein the client process 108, 110 loads the helper library 106 via any means known in the art. As previously discussed, the helper library 106 is suitably adapted to provide an interface between the requesting client process and the suballocation server 102. The client process 108, 110 then submits, at step 304, a request to the suballocation server 102, via the helper library 106, for allocation of shared memory. In the preferred embodiment, the allocation request includes data representative of an amount, i.e., size, of shared memory required by the requesting process. At step 306, the shared memory request is communicated to the suballocation server 102 via any means known in the art. Suitable communications means include, but are not limited to, message queues, sockets, and the like.

At step 308, a manager unit 112, incorporated with the suballocation server 102, allocates blocks for the requesting client process of a size corresponding to the size contained in the memory request. Preferably, the allocation involves the slicing of one or more segments of shared memory 104, thereby creating a block of the size required by the requesting client process 108, 110. The suballocation server 102 then generates a pair at step 310 containing an identification of the shared memory segment from which the block is allocated and an offset within this shared segment indicating where in the segment the new allocated block begins. The generated pair is then transmitted to the helper library 106 at step 312 via any suitable means known in the art. The helper library 106, which contains application program interfaces to enable communication and interaction with requesting client processes

108, 110, then translates the pair from the address space used by the suballocation server 102 to the address space recognizable by the requesting client process. To facilitate translation, the helper library 106 first maps the shared segment identified by the issued segment identification to the requesting client process's address space at an address X. The helper library 106 then computes the starting address Y of the newly allocated block by adding the offset contained in the received pair to the address X, resulting in a memory address that is recognizable by the requesting client process.

The memory allocation information, i.e., the dynamic data structures used by the suballocation server 102, are then stored in an associated persistent storage 114 at step 318. It will be understood by those skilled in the art that the data structures suitably include, but are not limited to, state data representative of those memory blocks free and those memory blocks allocated, manager unit 112 data structures, and the like. Flow then proceeds to step 320, wherein a determination is made whether the operation of the suballocation server 102 has been interrupted. When operation has been interrupted, flow proceeds to step 322, wherein the memory allocation information is retrieved from the persistent storage 114 and the suballocation server 102 is reinitialized with the stored state information. Flow then progresses to step 324, wherein the suballocation server 102 determines whether the client process 108, 110 has released the shared memory block allocated to it. When the client process is still using the memory, the memory allocation information is updated on the persistent storage 114 to reflect its de-allocation at step 326, and the memory is made available for allocation to other requesting client processes. Returning to step 320, when operation has not been interrupted, flow proceeds to step 324, wherein a determination is made whether or not the memory has been released by the requesting client process. When the memory has not been released, flow returns to step 320. When the memory has been released, flow progresses to step 326, wherein the memory allocation information is updated and the operation terminates.

Figure 4:
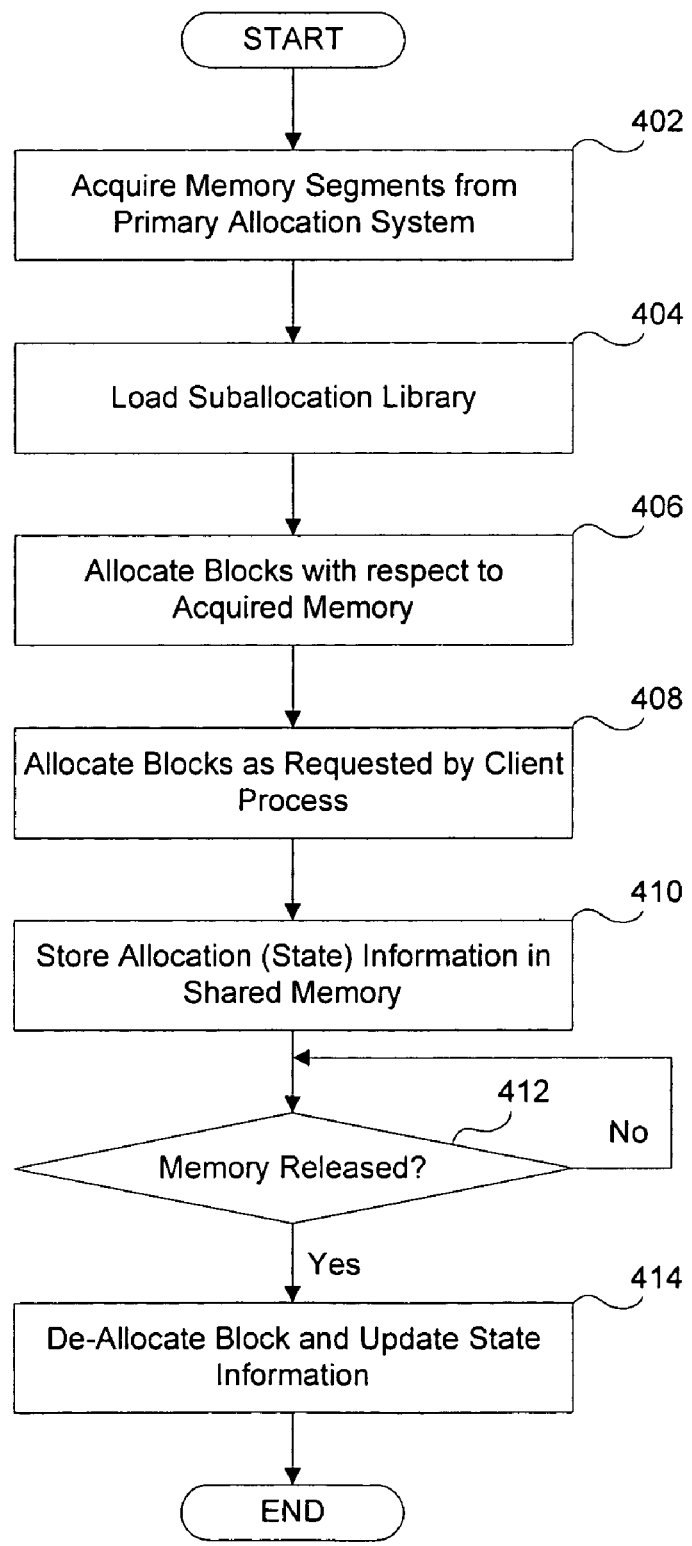
FIG. 4 is a flow chart illustrating an in-process method for allocation of random access memory in accordance with the present invention.

Turning now to FIG. 4, there is shown a flowchart 400 illustrating the in-process operation of the suballocation server 102 in accordance with the present invention. As shown in FIG. 4, the method begins at step 402, wherein shared memory segments are acquired from a primary memory allocation system, preferably from an associated operating system. At step 404, the client process 108 loads a shared suballocation library. In accordance with the present invention, the shared suballocation library is an in-process component dynamically loaded by the client process 108 into its address space. Preferably, the data structures responsible for maintaining memory block allocation information are accessible to each of the client processes 108, 110. More preferably, the allocation information is stored in a portion of the shared memory area so that each client process 108, 110 dynamically loading the suballocation library has access.

Returning to the method of FIG. 4, at step 406, the suballocation library allocates blocks with respect to the shared memory previously acquired. At step 408, the blocks, in a size corresponding to a size requested by the client process 108, are allocated to the client process 108 by the suballocation library. At step 410, the allocation information is stored in shared memory, or alternatively in a mapped memory file, as discussed above. Flow then proceeds to step 412, wherein a determination is made whether the memory block allocated to the requesting client process 108 has been released. When the block has not been released, flow loops back to step 412 until a determination is made that the memory block is no longer used by the requesting client process 108 and has been released. When the allocated memory block has been released by the client process 108, flow proceeds to step 414, wherein the block is de-allocated by the suballocation library and the allocation information residing in the shared memory is correspondingly updated, whereupon the operation terminates.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

While in the preferred embodiment the present invention is implemented in software, as those skilled in the art can readily appreciate it may also be implemented in hardware or a combination of software and hardware. Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for allocation of random access memory comprising:

a memory and management application process operable as instructions stored in the memory and operating on an operating system running on an associated processor, the management application process including means adapted for acquiring a memory area from a primary, hardware-based memory allocation system of an associated data processing system, which memory area is comprised of a plurality of uniformly fixed size memory blocks;

an application program interface, which application program interface is adapted to provide a software interface between the management application process and each of a plurality of concurrently operable processes on the processor in connection with memory needed for each process such that memory allocation is completed via the management application process running above the hardware-based memory allocation system; and wherein the management application process further includes, means adapted for receiving a memory request from each of the plurality of processes via the application program interface, each memory request including data representative of a requested memory allocation size associated therewith, memory allocation means adapted for allocating to each of the plurality of processes and corresponding to each received memory request, memory from the plurality of acquired memory blocks, each allocation being defined by a base memory address disposed within the memory area, an offset value corresponding to the base memory address, and a corresponding memory allocation size;

means adapted for generating allocation data corresponding to an allocation of memory by the memory allocation means, means adapted for communicating allocation data to a non-volatile data storage, failure detection means adapted for detecting an application termination in at least one of the plurality of processes, and means adapted for loading allocation data from the non-volatile data storage after detection of a process failure by the failure detection means.

2. The system for allocation of random access memory of claim 1, further comprising:

means adapted to communicate to the non-volatile storage state data representative of memory allocation completed by the memory allocation means;

restart means adapted to selectively resume a terminated memory allocation operation of the memory allocation means; and means adapted to receive state data into the memory allocation means from the non-volatile storage in accordance with the restart means.

3. The system for allocation of random access memory of claim 2, further comprising means adapted for updating, in the non-volatile storage, the state data in response to a de-allocation of memory.

4. A method for allocation of random access memory comprising the steps of:

commencing a management application process operable on an operating system running on associated processor;

acquiring a memory area from a primary, hardware-based memory allocation system of an associated data processing system, which memory area is comprised of a plurality of uniformly fixed size memory blocks;

interfacing, via an application program interface, between the management application processes and each of a plurality of concurrently operable processes on the processor in connection with memory needed for each process such that memory allocation is completed via the management application process running above the hardware-based memory allocation system;

receiving a memory request from each of the plurality of processes via the application program interface, each memory request including data representative of a requested memory allocation size associated therewith;

allocating to each of the plurality of processes and corresponding to each received memory request, memory from the plurality of acquired memory blocks, each allocation being defined by a base memory address disposed within the memory area, an offset value corresponding to the base memory address, and a corresponding memory allocation size;

generating allocation data corresponding to an allocation of memory;

communicating allocation data to a non-volatile data storage;

detecting an application termination in at least one of the plurality of processes; and loading allocation data from the non-volatile data storage after detection of a process failure by the failure detection step.

5. The method for allocation of random access memory of claim 4, further comprising the steps of:

communicating to the non-volatile storage state data representative of memory allocation completed by the memory allocating step;

selectively restarting a terminated memory allocation operation; and receiving state data from the non-volatile storage in accordance with the restart of the memory allocation operation.

6. The method for allocation of random access memory of claim 5, further comprising the step of updating, in the non-volatile storage, the state data in response to a de-allocation of memory.

* * * * *